Feb. 15, 1966   J. C. MEDLEY ETAL   3,235,310
DUMP BODY DOOR OPERATING MECHANISM
Filed May 7, 1964

INVENTORS
JACKSON C. MEDLEY
BY DONALD E. MERRITT

ATTORNEYS

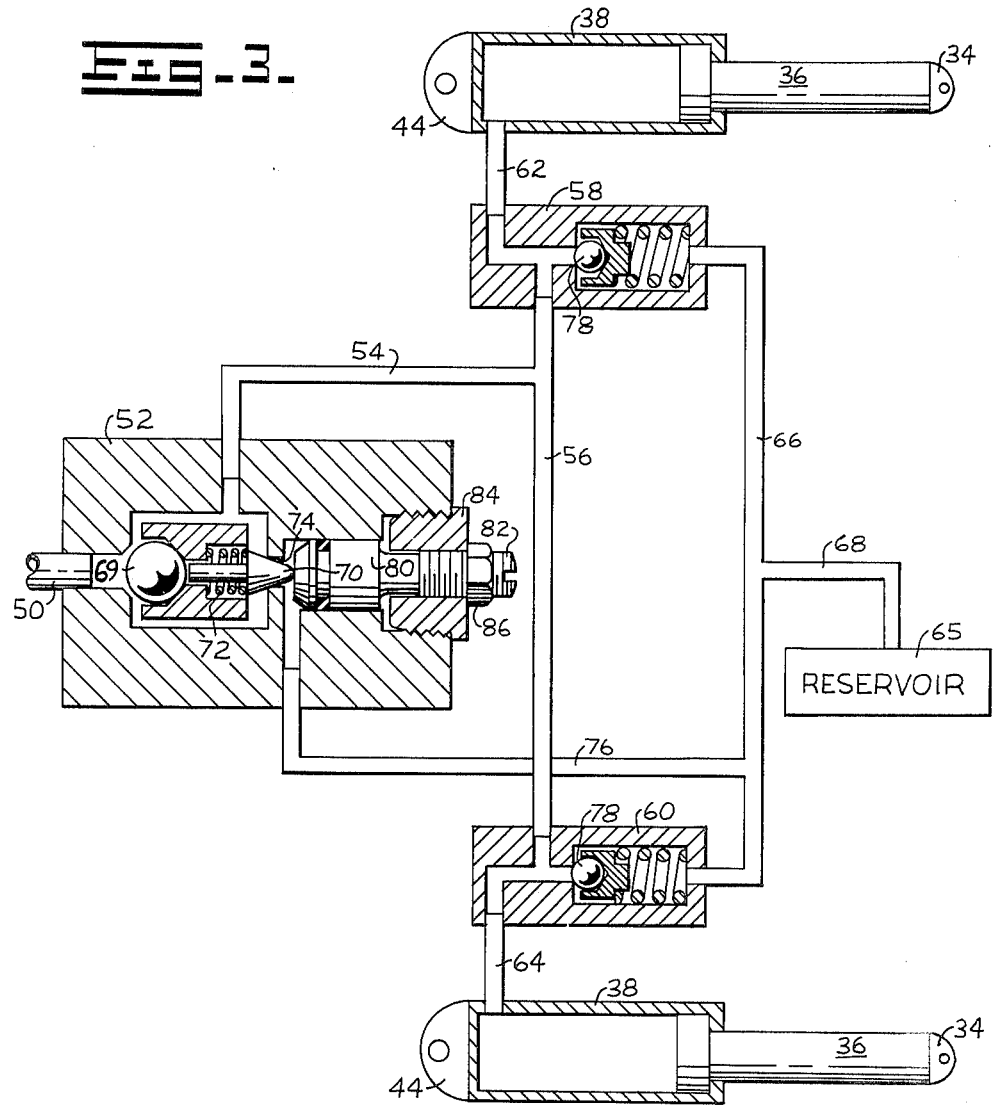

United States Patent Office 3,235,310
Patented Feb. 15, 1966

3,235,310
DUMP BODY DOOR OPERATING MECHANISM
Jackson C. Medley, East Peoria, and Donald E. Merritt, Peoria Heights, Ill., assignors to Caterpillar Tractor Co., Peoria, Ill., a corporation of California
Filed May 7, 1964, Ser. No. 365,648
8 Claims. (Cl. 298—23)

This invention relates to a door operating mechanism and more particularly to a linkage mechanism for opening and closing a door of a dump body.

Presently available vehicle dump bodies, whether side or rear dump bodies, provide a mechanical linkage which operates to open a door as the body is being tilted. In certain instances the material being dumped shifts toward the door before it is fully opened thereby imposing excessive dynamic forces on the door which may result in impairment of the door operating mechanism or bending of the door.

This invention solves these and other problems by providing a door operating linkage mechanism that automatically completely opens the door before any substantial amount of material moves relative to the dump body. The linkage mechanism of this invention is also operable to open and close the door independently of the tilting movement of the body.

The door operating linkage mechanism of this invention includes hydraulic actuators which are associated with an hydraulic circuit that may be conditioned to maintain the actuators in their fully-extended position in order to constitue a relatively rigid link of constant length. In addition, the hydraulic circuit includes valve mechanisms for relieving the pressure in the actuators in order to completely open the door while the dump body is in its tilt-down position.

Accordingly, it is an object of this invention to provide a new and improved door operating mechanism.

Another object of this invention is to effect opening of a dump body door while the body is in its tilt-down position.

Another object of this invention is to provide a new and improved door operating mechanism which is optionally operable, in response to the tilting movement of a dump body associated therewith, or is operable to open the door while the dump body is in its tilt-down position.

Another object of this invention is to provide a new and improved door operating mechanism for operating the door on the dump body which permits limited restrained movement of the door in the event excessive loads are imposed on the door.

These and other objects of the invention will become more apparent upon consideration of the following detailed description of a preferred embodiment thereof, when taken in conjuntcion with the following drawings in which:

FIG. 3 is a schematic of the hydraulic circuit, with certain of the components shown diagrammatically, for pressurizing the actuators incorporated in the door operating linkage mechanism.

Figure 1:
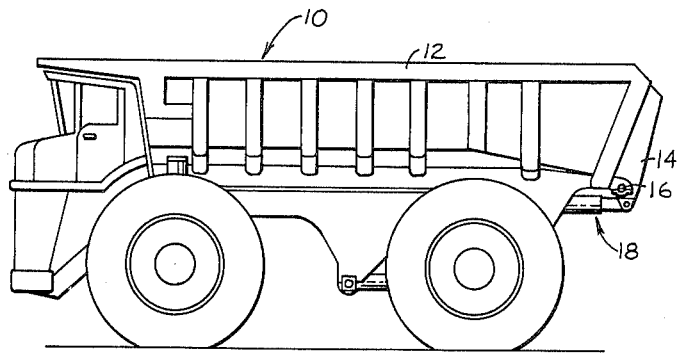
FIG. 1 is a side elevation of a vehicle supporting a dump body which includes a door operating mechanism constructed in accordance with the principles of this invention.

Referring now to FIG. 1 there is shown a conventional wheel mounted haulage vehicle 10 which has pivotally mounted thereon a rear dump body 12. A door 14 extending tranvsersely across the rearward end of the dump body 12 is pivotally mounted at 16 to the body 12. The novel linkage mechanism of this invention is indicated by the numeral 18 and it is effective, as desired, to permit clockwise rotation of the door 14 about the pivotal connection 16 as the body 12 is tilted upwardly in a clockwise direction relative to the body.

Figure 2:
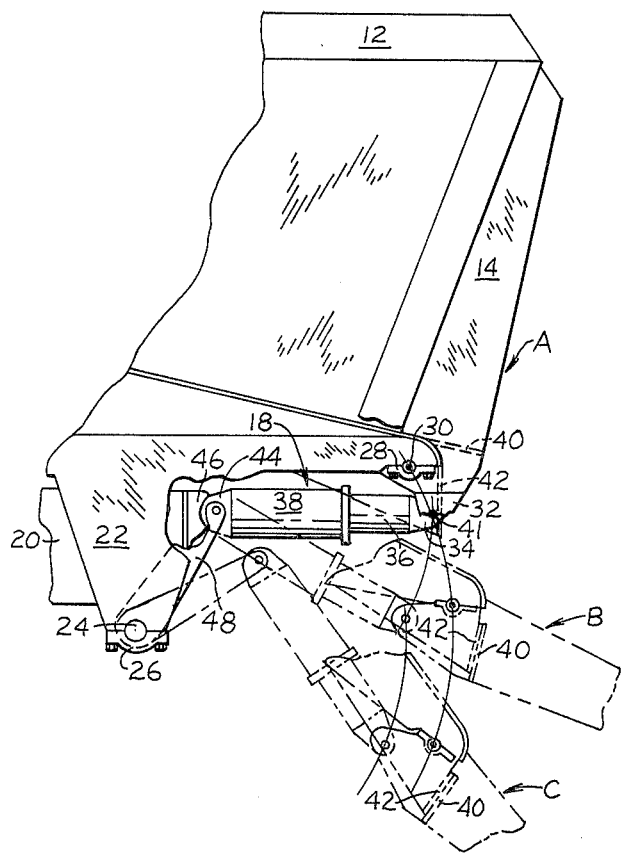
FIG. 2 is an enlarged side view of the rear portion of the dump body shown in FIG. 1 illustrating the operation of the linkage mechanism when the tiltable body assumes various angles of inclination.

Although only one linkage mechanism is shown in FIG. 2 it is to be understood two of such mechanisms, of identical construction, are provided. Each of such mechanisms are located in transverse alignment and on opposite sides of the longitudinal axis of the vehicle. As shown, the dump body 12 is pivotally supported on the longitudinal frame members 20 of the haulage vehicle by means of transversely aligned downwardly extending extensions 22 having bearings 26 on the lower end thereof for receiving a transversely extending shaft 24 affixed to the longitudinal frame members 20. It is to be appreciated that the above-described manner in which the dump body 12 is mounted for pivotal movement on the frame of the haulage vehicle is merely exemplary since it may take various forms known to those skilled in the art.

The lower end of the door 14 is pivotally connected to the bottom rearward end of the body 12 by a transverse shaft 30 supported in bearing 28 permitting the door to be rotated about the shaft 30. The door 14 includes downwardly extending closely adjacent plates 32 which define a slot for slidably receiving a tongue 34 formed on the end of a rod 36 of a single acting linear actuator 38. A pin 41, extending through aligned holes in the tongue 34 and the plates 32 define a clevis connection attaching the actuator 38 to the door 14. Cooperating stop plates 40 and 42, mounted on the door 14 and on the rearward end of the bottom of the dump body 12, respectively, are provided for determining the fully opened position of the door 14. When the gate 14 is in its fully opened position and the stops 40 and 42 are in abutting engagement, the inner surface of the gate defines a continuation of the bottom surface of the dump body 12. This is shown in phantom outline in FIG. 2, with the various positions of the dump body and the door actuating mechanism indicated by the letter A, when the body 12 is in its tilt-down position; by the letter B, when the body 12 has been tilted at an inclination of approximately 26°; by the letter C, when the body 12 has been tilted at an inclination of approximately 51°.

The head end of the linear actuator 38 is also formed with a tongue 44 and, in the projection shown in FIG. 2, the tongue 44 is arcuate. A bearing segment 46, in longitudinal alignment with the actuator 38, is fixed to the frame member 20 for freely rotatably receiving the arcuate portion of the tongue 44. The bearing segment 46 permits the actuator 38 to rotate relative thereto when the dump body is in the position indicated by the letter B; and permits the actuator to be disengaged therefrom when the dump body is in the position shown by the letter C. A pair of link members 48 are provided with each linear actuator 38 and have respective ends rotatably mounted on the shaft 24 and the remaining ends pinned to the tongue 44 thereby defining a clevis connection.

Pressure fluid having a value of pressure of approximately 2,000 pounds per square inch, which is derived from an accumulator provided with the haulage vehicle, is supplied to the actuator 38 at all times. Such pressure fluid is effective to maintain the rod 36 in its fully extended position and thus constitute a relatively rigid link.

The tailgate linkage mechanism 18 operates to automatically open the door 14, which opens under the influence of gravity, as the dump body 12 is pivoted or rotated in a clockwise direction about the axis of the shaft 24. During such rotation, the actuator 38 is also rotated in a clockwise direction in the bearing segment 46 and, by virtue of a pin connection 41, applies a turning moment to the door 14 about the axis of the shaft 30 until the stop plates 40 and 42 abut each other as shown in position B. In this position the inner surface of the door 14 defines a continuation of the bottom of the dump body 12. It is to be realized that if a large heavy object, such as a rock, should move toward the door 14 before it is fully opened, the force against the door would be imposed on the actuator 38 tending to and possibly causing, longitudinal retraction thereof which in turn permits the door to open an amount proportional to the magnitude of such force. The inclination of the dump body 12 at which the door is fully opened, however, has been chosen so that very little, if any, shifting of the load center of gravity occurs.

As the body 12 moves from position B to position C, the links 48 rotate relative to the shaft 24 due to the translatory motion imparted to the actuator 38 by he tilting movement of the body 12. From position A to position B the actuator 38 rotates about the axis of the bearing segment 46 but as the dump body continues movement from position B to position C, the tongue 44 becomes unseated from the bearing segment 46 by virtue of its securement to the plates 32 by the pin 41 and the center of rotation of the actuator 38 is transferred from the axis of the bearing segment 46 to the axis of the shaft 24 thereby causing translation of the actuator 38 to the phantom outline position indicated at C.

In the event the haulage vehicle is moved forward while the body 12 is in its fully tilted-up position, any obstruction such as a large rock or a pile of dirt which may strike the gate, would not cause damage to the door or the actuating mechanism since pivotal movement of the door 14 about the shaft 30 would be permitted because the actuator 38 and the links 48 would merely pivot relative to the shaft 24 permitting the door to rotate about the shaft 30. In addition, if the dump body is lowered before the entire load is dumped the portion of the load on the door would cause the actuator to retract thus preventing injury to the door or the linkage mechanism. Other operational advantages of this invention will be pointed out after the description of the hydraulic circuit shown in FIG. 3.

The hydraulic circuit shown in FIG. 3 includes a conduit 50 for delivering pressure fluid from an accumulator (not shown) to a check-dump valve 52 from which the pressure fluid is delivered by conduits 54 and 56 to relieve valves 58 and 60. Pressurized fluid from each of the relief valves is communicated to the actuators 38 by the conduits 62 and 64. The relief valves 58 and 60 are connected to a reservoir 65 by conduits 66 and 68 for returning fluid to the reservoir.

The check-dump valve 52 includes a valve element which exhausts the pressure fluid from the actuators 38 thereby causing retraction of the piston rods 36 and consequently permitting the door 14 to open. This valve comprises a conical valve element 70 having a cylindrical stem of reduced diameter surrounded by a spring 72 which biases the valve in sealing relationship with a passageway 74. A conduit 76 provides communication between the passageway 74 and the conduits 66 and 68 for returning fluid to the reservoir 65. A cylindrical plunger 80 having a threaded stem 82, is disposed in a reducer bushing 84 which is threaded in the body of valve 52. A lock nut 86 is threaded on the outwardly projecting portion of the stem 82 to maintain the plunger 80 in a desired position. As viewed in FIG. 3, rotation of the plunger 80 relative to the bushing 84, in the direction causing axial movement of the plunger 80 toward the valve 70, and unseating the valve 70 to establish communication between the conduits 54, 56, 62, 64 and the actuators 38, with the conduits 76, 66 and 68 allows the fluid in the actuators to flow to the reservoir 65. Movement of valve 70 in a leftward direction as viewed in FIG. 3 preferably moves a ball check 69 to close inlet conduit 50 to thus effect an expeditious movement of piston rods 36. Otherwise stated, if ball check 69 was not closed, passageway 74 would have to discharge fluid from actuators 38 as well as inlet 50. This causes inward axial movement of the piston rods 36 and consequent opening of the door 14 which is under the influence of gravity. It is apparent, therefore, that the door can be operated independently of the tilting action of the dump body 12.

The overall operation of this invention is as follows: Pressure fluid at approximately 2,000 p.s.i. is delivered to the check-dump valve 52 by the conduit 50 past a ball check 69 and to the conduit 54 which delivers the pressure fluid to the conduits 56, 62 and 64 pressurizing the head-end of the actuator 38 and thereby maintain the piston rods 36 in their extended position. The valve 70 is biased by the spring 72 blocking the passageway 74 to prevent return of pressure fluid to the reservoir 65 by the conduit 76. In the event the actuators 38 are subjected to an axial force causing inward movement of the piston rods 36, and thus raising the value of pressure in the head-end of the actuator, the spring biased balls 78 associated with the relief valves 58 and 60 are unseated allowing a portion of the pressure fluid to be discharged into the conduit 66 and the conduit 68 for return to the reservoir 65.

During the loading of the haulage vehicle heavy masses such as rock may strike the door 14 with great force imposing a turning moment tending to rotate the door about the shaft 30 which transfers such force to the actuator 38 by virtue of the pin 41 resulting in inward movement of the rods 36. An instantaneous rise in pressure occurs in each of the actuators 38 causing the balls 78 to become unseated and allowing pressure fluid to return to the reservoir 65 by the conduit 66 and 68. Rather than cause damage to the linkage mechanism 18 or the door 14 in the event such a force against the door is greater than the force exerted by the actuators 38, the door rotates clockwise until the force of the turning moment is equal to the force exerted by the actuators. If the force is great enough the door may be fully opened.

As a result of this invention, it is seen that by providing the actuators 38 in the door operating linkage mechanism 18, operation of the door in response to the tilting movement of the body 12 is attained and the actuators also permit the door to be operated independently of the tilting action of the body. Additionally, the actuators enable the door to give way in the event of excessive loads thereby preventing damage to the door and the linkage mechanism.

We claim:

1. In a tiltable dump body of the type wherein a linkage mechanism is associated therewith which is operable in response to upward tilting movement of the body for opening a door in order to allow gravitational discharge of the contents of the body, the combination with said linkage mechanism of a pressure fluid actuator maintained in its fully extended position during tilting, said actuator being arranged to define a link of said mechanism.

2. In a tiltable dump body of the type wherein a linkage mechanism is associated therewith which is operable in response to upward tilting movement of the body for opening a door in order to allow gravitational discharge of the contents of the body, the combination with said linkage mechanism of a pressure fluid actuator maintained in its fully extended position during tilting, said actuator being arranged to define a link of said mechanism, means for supplying pressure fluid to said actuator including a valve mechanism for allowing the pressure fluid in said actuator to be exhausted in order to effect opening and closing of said door independently of the tilting movement of said body.

3. In a tiltable dump body of the type wherein a linkage mechanism is associated therewith which is operable in response to upward tilting movement of the body for opening a door in order to allow gravitational discharge of the contents of the body, the combination with said linkage mechanism of a pressure fluid actuator maintained in its fully extended position and constituting a link of said linkage mechanism, means for supplying pressure fluid of a selected value of pressure to said actuator, and means for exhausting fluid from said actuator in response to the force derived from the material in said body tending to open said door so that damage to said door and said linkage mechanism is prevented.

4. A linkage mechanism for opening and closing an upwardly extending door which is pivotally connected to the bottom rearward end of a dump body comprising: a single-acting actuator having one end pivotally connected to a depending portion of the door, a rigidly supported bearing segment for rotatably receiving the other end of said actuator, and links having respective ends mounted for rotation about a fixed axis and the other end pivotally connected to said other end of said actuator, said linkage mechanism being operative in response to the upward tilting of the body to retain said other end of said actuator in rotatable engagement with said bearing segment until said door is fully opened and operative to translate said actuator from said bearing segment as the body continues tilting upwardly.

5. A linkage mechanism for opening and closing an upwardly extending door which is pivotally connected to the bottom rearward end of a dump body comprising: an actuator having the piston rod thereof pivotally connected to the door, a bearing segment for freely rotatably receiving an arcuate portion formed on the head end of said actuator, and links having respective ends mounted for rotation about a fixed axis and the other end pivotally connected to the head end of said actuator, said linkage mechanism being operative in response to the upward tilting of the body to retain the arcuate portion of said actuator in rotatable engagement with said bearing segment until said door is fully opened and effect translation of said actuator from said bearing segment as the body continues tilting upwardly.

6. A linkage mechanism for opening and closing an upwardly extending door which is pivotally connected to the bottom rearward end of a dump body comprising: an hydraulic actuator having the end of the rod thereof pivotally connected to a downwardly extending portion of said door and the head end pivotally connected to a pair of links which are mounted for rotation on a shaft, and a bearing segment for freely rotatably supporting a complementary shaped tongue formed on the head end of said actuator, said linkage mechanism being operative in response to the upward tilting of the body to retain said head end of said actuator in rotatable engagement with said bearing segment until said door is fully opened and operative to translate said actuator from said bearing segment as the body continues tilting upwardly.

7. A tiltable dump body having upwardly extending walls with one of the walls being pivotally connected at its lower end to define a door by which material is discharged from such body comprising: a linkage mechanism operable in response to the tilting movement of the body for opening and closing the door, a pressure fluid operated linear actuator defining a link of said mechanism, and an hydraulic circuit for supplying pressure fluid to said actuator wherein the value of pressure communicated to said actuator is sufficient to maintain it in its fully extended position during tilting to thereby constitute a substantially longitudinally rigid link.

8. A tiltable dump body having upwardly extending walls with one of the walls being pivotally connected at its lower end to define a door by which material is discharged from such body comprising: a linkage mechanism operable in response to the tilting movement of the body for opening and closing the door, a pressure fluid operated linear actuator defining a link of said mechanism, an hydraulic circuit for supplying pressure fluid to said actuator wherein the value of pressure communicated to said actuator is sufficient to maintain it in its fully extended position during tilting to thereby constitute a substantially longitudinally rigid link, and selectively operable valve means in said circuit for exhausting the pressure fluid from said actuator so that said door may be opened and closed independently of the tilting movement of the body.

References Cited by the Examiner
UNITED STATES PATENTS

| | | | |
|---|---|---|---|
| 1,983,280 | 12/1934 | Flowers. | |
| 2,200,271 | 5/1940 | Flowers. | |
| 2,261,099 | 10/1941 | Fairbanks | 298—23 |
| 2,683,545 | 7/1954 | Wood | 298—23 X |

BENJAMIN HERSH, *Primary Examiner.*

ARTHUR L. LA POINT, *Examiner.*